(12) United States Patent
Wu et al.

(10) Patent No.: US 10,473,475 B2
(45) Date of Patent: Nov. 12, 2019

(54) METHOD AND APPARATUS FOR DETERMINING A LOCATION OF A POINT OF INTEREST

(71) Applicant: Baidu Online Network Technology (Beijing) Co., Ltd., Beijing (CN)

(72) Inventors: Haishan Wu, Beijing (CN); Tianyi Wang, Beijing (CN); Tong Zhang, Beijing (CN)

(73) Assignee: Baidu Online Network Technology (Beijing) Co., Ltd, Beijing (CN)

( * ) Notice: Subject to any disclaimer, the term of this patent is extended or adjusted under 35 U.S.C. 154(b) by 0 days.

(21) Appl. No.: 14/954,788

(22) Filed: Nov. 30, 2015

(65) Prior Publication Data

US 2016/0377443 A1 Dec. 29, 2016

(30) Foreign Application Priority Data

Jun. 26, 2015 (CN) .......................... 2015 1 0369384

(51) Int. Cl.
*G01C 21/34* (2006.01)
*G06Q 10/06* (2012.01)

(52) U.S. Cl.
CPC ..... *G01C 21/3476* (2013.01); *G01C 21/3492* (2013.01); *G06Q 10/0637* (2013.01)

(58) Field of Classification Search
CPC ............ G01C 21/3476; G01C 21/3484; G01C 21/3492; G06Q 10/0637
See application file for complete search history.

(56) References Cited

U.S. PATENT DOCUMENTS

| | | | |
|---|---|---|---|
| 7,640,196 B2 * | 12/2009 | Weiss ..................... | G06Q 30/02 705/35 |
| 2010/0205060 A1 * | 8/2010 | Athsani .............. | G01C 21/3484 705/14.58 |
| 2010/0268449 A1 * | 10/2010 | Feng ................... | G01C 21/3476 701/533 |

(Continued)

FOREIGN PATENT DOCUMENTS

| | | |
|---|---|---|
| CN | 104657933 A | 5/2015 |
| EP | 2741535 A1 | 6/2014 |

(Continued)

*Primary Examiner* — Jerrah Edwards
*Assistant Examiner* — Mathew Franklin Gordon
(74) *Attorney, Agent, or Firm* — Knobbe Martens Olson & Bear LLP (57) ABSTRACT

A method and apparatus are for determining a location of a new point of interest by determining demand information of a user based on retrieval data of the user. The retrieval data includes at least point of interest data, and the demand information includes at least a demand occurrence position. Supply information, including at least a supply region of existing points of interest are obtained based on the retrieval data. The demand information of the user is matched with the supply information of the existing points of interest to obtain the unsatisfied demand information of the user. The location of the new point of interest is determined based on the unsatisfied demand information of the user. The demand information for determining the location of a new point of interest is more accurate and comprehensive, and accuracy and reliability of the site selection of a new point of interest are improved.

18 Claims, 10 Drawing Sheets

(56) References Cited

U.S. PATENT DOCUMENTS

| | | | |
|---|---|---|---|
| 2013/0054698 A1* | 2/2013 | Lee | G06Q 30/0259 |
| | | | 709/204 |
| 2013/0211963 A1* | 8/2013 | Williams | G06Q 30/04 |
| | | | 705/26.43 |
| 2015/0006255 A1 | 1/2015 | Schewel et al. | |
| 2016/0055503 A1* | 2/2016 | Chan | G06Q 30/0205 |
| | | | 705/7.34 |

FOREIGN PATENT DOCUMENTS

| | | |
|---|---|---|
| JP | 2004185539 A | 7/2004 |
| JP | 2012221354 A1 | 11/2012 |
| KR | 100779380 B1 | 11/2007 |
| KR | 1020090053120 A | 5/2009 |
| WO | 2014034310 A1 | 3/2014 |

\* cited by examiner

METHOD AND APPARATUS FOR DETERMINING A LOCATION OF A POINT OF INTEREST

CROSS REFERENCE TO RELATED APPLICATION

The present application claims priority and benefits of Chinese Patent Application No. 201510369384.9, filed on Jun. 26, 2015, the entirety of which is incorporated herein by reference.

TECHNICAL FIELD

The present application relates to the field of computer technology, and in particular, to the field of electrical digital data processing, and more particularly, to a method and an apparatus for determining a location of a new point of interest.

BACKGROUND

Site selection refers to the process of reasoning and decision-making on location before implementing construction or making investment. The location of a new point of interest is determined on analysis of a population flow and potential users, which comprises: profiling and estimating a regional population flow and potential users, and selecting a site for a new point of interest based on geographical features such as a large population flow.

However, in the above site selection based on the population flow and potential users, a few of information dimensions are considered, which leads to poor accuracy and reliability of the site selection result.

SUMMARY

In view of the above drawbacks or deficiencies in the prior art, it is desired to provide a solution of high accuracy and high reliability. In order to achieve one or more of the above goals, embodiments of the present application provides a method and an apparatus for determining the location of a new point of interest.

In a first aspect, an embodiment of the present application provides a method for determining a location of a new point of interest, which includes: determining demand information of a user based on retrieval data of the user, wherein the retrieval data includes at least data of point of interest and the demand information includes at least a demand occurrence position; obtaining supply information of existing points of interest based on the retrieval data, wherein the supply information includes at least a supply region; matching the demand information of the user with the supply information of the existing points of interest to obtain unsatisfied demand information of the user; determining the location of the new point of interest based on the unsatisfied demand information of the user.

In a second aspect, an embodiment of the present application provides an apparatus for determining a location of a new point of interest, which includes: a demand determining module for determining demand information of a user base on retrieval data of the user, wherein the retrieval data includes at least data of point of interest and the demand information includes at least a demand occurrence position; a supply determining module for obtaining supply information of existing points of interest based on the retrieval data, wherein the supply information includes at least a supply region; a demand matching module for matching the demand information of user with the supply information of the existing points of interest to obtain unsatisfied demand information of the user; a location determining module for determining the location of the new point of interest based on the unsatisfied demand information of the user.

According to the method and the apparatus for determining a location of a new point of interest provided in an embodiment of the present application, user demand information can be determined based on user retrieval data. Then, supply information corresponding to the demand information is determined, and then, the supply information and demand information are matched to obtain the unsatisfied demand information of the user. Finally, a location of a new point of interest is determined based on the unsatisfied demand information of the user. The demand information for determining the location of a new point of interest in the method and apparatus is more accurate and comprehensive, thus the accuracy and reliability of the site selection of a new point of interest are improved.

BRIEF DESCRIPTION OF THE DRAWINGS

Other features, objects and advantages will become more apparent from the detailed description to non-limiting embodiments with reference to the accompanying figures, wherein.

DETAILED DESCRIPTION

The present application will be further described in detail in conjunction with the accompanying drawings and embodiments. It will be understood that the specific embodiments described herein are only intended to explain the invention, instead of limiting the invention. It should also be noted that only portions related to the invention are shown in the figures for the convenience of description.

It should be noted that the embodiments of the present application and the features in the embodiments may be combined with each other if there is no conflict. Now the present application will be further described in detail in conjunction with the accompanying drawings and embodiments.

Figure 1:
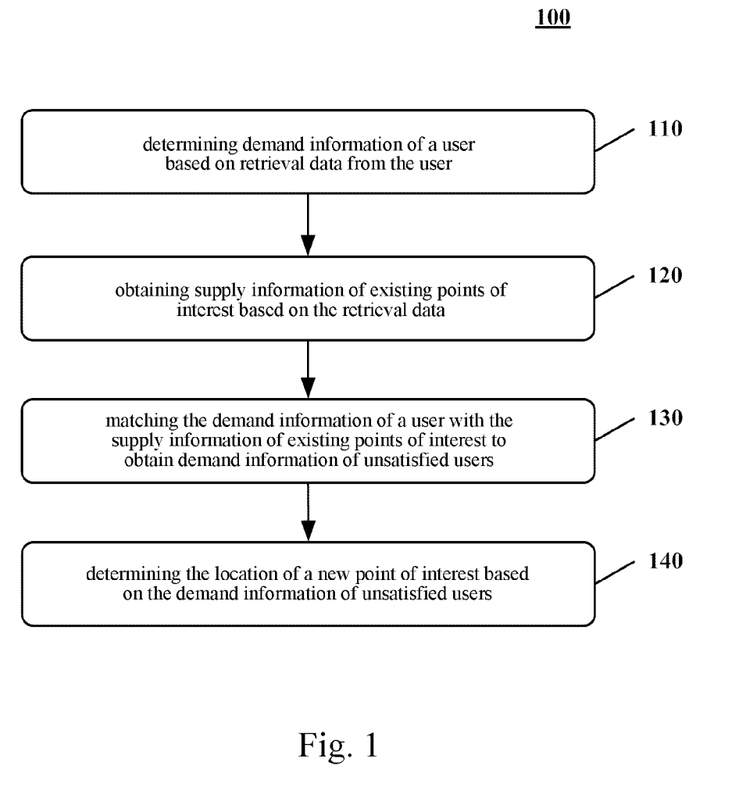
FIG. 1 shows an illustrative flow chart of a method for determining a location of a new point of interest according to an embodiment of the present application.

Referring to FIG. 1, an illustrative flow chart 100 of the method for determining a location of a new point of interest according to an embodiment of the present application is shown. This embodiment is illustrated by taking a server capable of processing mass data as an example to implement the method. It will be understood that the server is a generalized server, which may be one server, or a server cluster or a server group capable of data sharing. The method for determining the location of a new point of interest comprises the following steps.

In step 110, user demand information is determined based on retrieval data of a user.

In this embodiment, firstly, the retrieval data of a user may be obtained based on a retrieval request received from the user. The retrieval data may include data of point of interest from a retrieval engine and the position where the retrieval is performed (for example latitude and longitude coordinates). Optionally, the retrieval data may also include but is not limited to at least one of the following data from a retrieval engine: user identity information, time of a retrieval request and retrieval key words, and the like. The retrieval data may also include data of the point of interest and a start point (name and coordinates) from a map service. Optionally, the retrieval data may also include but is not limited to at least one of the following data from the map service: user identity information, time of the retrieval request, a destination point (name and coordinates) and current position coordinates, and the like. The above data of point of interest may include but is not limited to at least one of a name, a type, latitude and longitude coordinates, a specific address, a business district of a point of interest and the like.

Next, the user demand information may be determined based on the retrieval data of the user. The determined demand information may include a demand occurrence position. Optionally, the determined demand information may also include but is not limited to at least one of demand occurrence time, demand quantity, and user identity information.

In some implementations, demand information may be determined based on the retrieval data from a retrieval engine. For example, the position where a retrieval is performed is determined as a demand occurrence position; time of a retrieval request is determined as demand occurrence time; number of retrievals is determined as demand quantity; and user identity information of the retrieval data is determined as user identity information of the demand information.

In other implementations, the demand information may be determined based on the data from a map service. For example, a start point of a retrieval is determined as a demand occurrence position; a destination point of a retrieval is determined as a place satisfying the demand (demand satisfied position); time of a retrieval request is determined as demand occurrence time; number of retrievals is determined as demand quantity; and user identity information of the retrieval data is determined as user identity information of the demand information.

The description of the demand information is further enhanced by the optional parameters included in the above described demand information, which makes the demand information for determining the location of the new point of interest more accurate and comprehensive, and thus the accuracy and reliability of determining the location of a new point of interest is improved.

Figure 2:
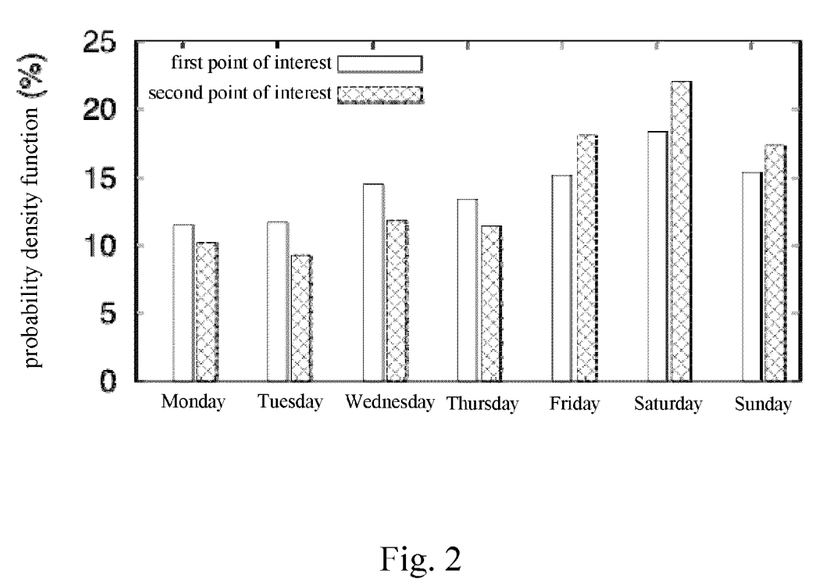
FIG. 2 shows a schematic diagram of distribution of a probability density function of demand occurred at two different points of interest per day within a week.
Figure 3:
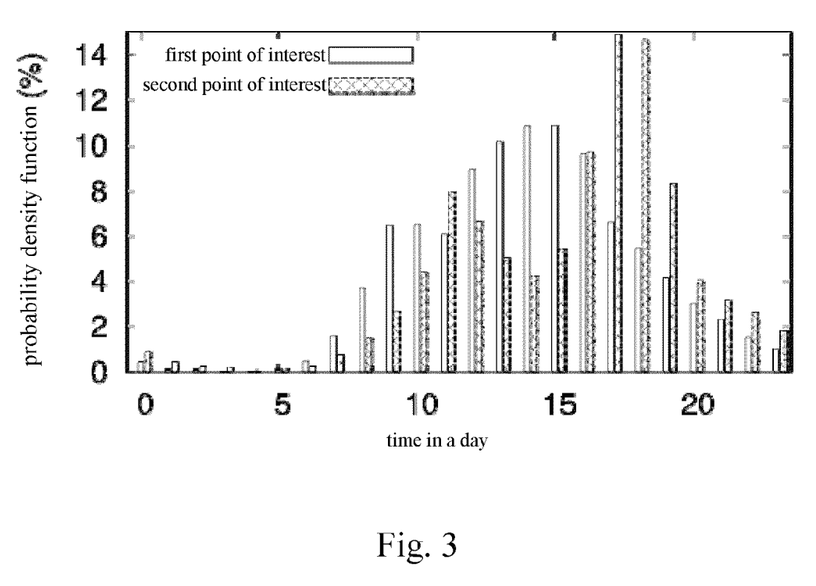
FIG. 3 shows a schematic diagram of distribution of a probability density function of demand occurred at two different Points of interest at different time within a day.

The demand occurrence time is taken as an example to describe the diagram illustrating a time distribution of user demand corresponding to points of interest of different types in conjunction with FIGS. 2 and 3.

FIG. 2 shows a schematic diagram of distribution of a probability density function of demand occurred at two different points of interest per day within a week.

As is shown in FIG. 2, the daily amount of user demand in correspondence with a first point of interest (leisure point of interest, such as a coffee shop) are relatively similar, and user demand in correspondence with a second point of interest (catering point of interest, such as a chafing dish restaurant) mainly occurs on weekends.

FIG. 3 shows a schematic diagram of distribution of a probability density function of demand occurred at two different points of interest at different time within a day.

As is shown in FIG. 3, user demand in correspondence with a first point of interest (leisure point of interest, such as a coffee shop) mainly occurs in the afternoon, and user demand in correspondence with a second point of interest (catering point of interest, such as a chafing dish restaurant) mainly occurs at dinner time.

The location of a new point of interest can be determined more accurately by using the temporal features of the demand information, i.e., the above demand occurrence time. For example, if a new point of interest is a leisure point of interest, its user demand is distributed relatively evenly per day, then a candidate location where the distribution of the user demand to be satisfied is relatively even may be selected as the location of the new point of interest. For example, a candidate location within a hybrid community of commerce and residence is selected as the location of a new point of interest. If the demand of a new point of interest mainly concentrates on weekends and at dinner time, a candidate location where a peak of the user demand to be satisfied occurs on weekends and at dinner time may be preferentially selected as the location of the new point of interest. For example, a candidate location within a large residential community may be selected as the location of a new point of interest.

Returning to FIG. 1, in step 120, supply information of an existing point of interest is obtained based on the retrieval data.

In this embodiment, the retrieval data is the same as that in the above step 110, and thus its description is omitted herein. The supply information of a point of interest may originate from a retrieval engine or a database storing supply information of preset points of interest. The supply information may include a supply region. Optionally, the supply information may also include, but is not limited to, at least one of a supply location, supply time, and supply quantity. The supply region may be determined based on the distance between the demand occurrence position and the supply location for a demand that has been satisfied in the historical data. For example, the radiation radius of the supply region may be determined based on the distances between the demand occurrence positions and the supply locations for demands of 80% of users that have been satisfied in the historical data.

Figure 4:
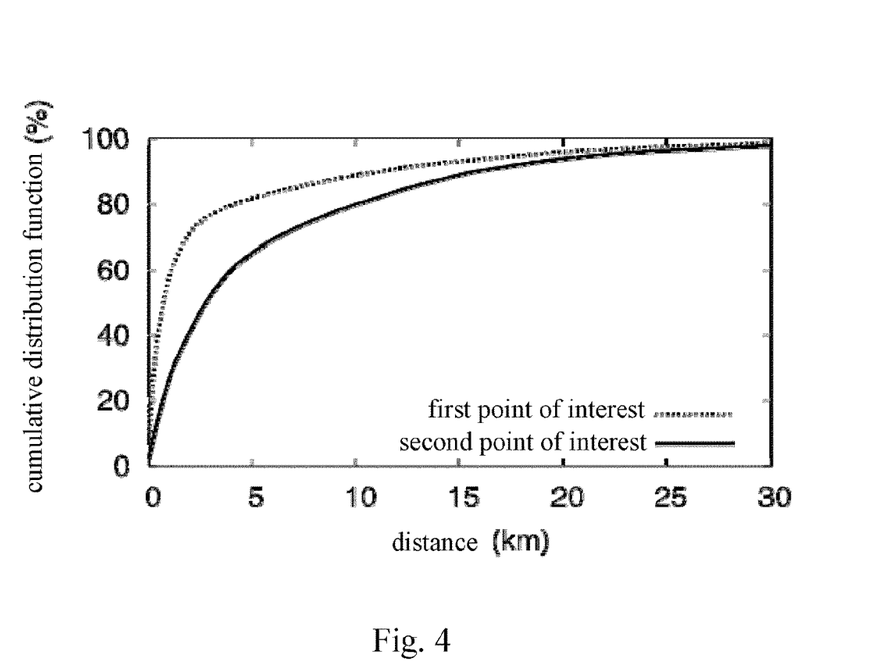
FIG. 4 shows a schematic diagram of distribution of a cumulative distribution function at two different points of interest based on the distance between a demand occurrence position and a supply location for a demand that has been satisfied.

The method for determining the supply region in accordance with the distance between the demand occurrence position and the supply location for the demand that has been satisfied in the historical data is described in conjunction with FIG. 4.

FIG. 4 shows a schematic diagram of distribution of a cumulative distribution function at two different points of interest based on the demand/supply distances of demands that have been satisfied.

As is shown in FIG. 4, the radiation radius of a first point of interest (leisure point of interest, such as a coffee shop) is determined to be 2 km based on the distances between the demand occurrence positions and the supply location of the demands of 80% of its users that have been satisfied in the historical data, and thus its supply region is a range within 2 km from the first point of interest; the radiation radius of a second point of interest (catering point of interest, such as a chafing dish restaurant) is determined to be 10 km based on the distances between the demand occurrence position and the supply location of the demands of 80% of its users that have been satisfied in the historical data, and thus its supply region is a range within 10 km from the second point of interest.

Returning to FIG. 1, in step 130, the demand information of a user is matched with the supply information of existing points of interest to obtain the unsatisfied demand information of the user.

During matching the demand information and the supply information of existing points of interest, a position matching may be performed firstly by matching a demand occurrence position of a user within the supply regions of the existing points of interest. If the demand occurrence position is located outside the supply regions, the demand of corresponding user has not been satisfied.

Figure 5:
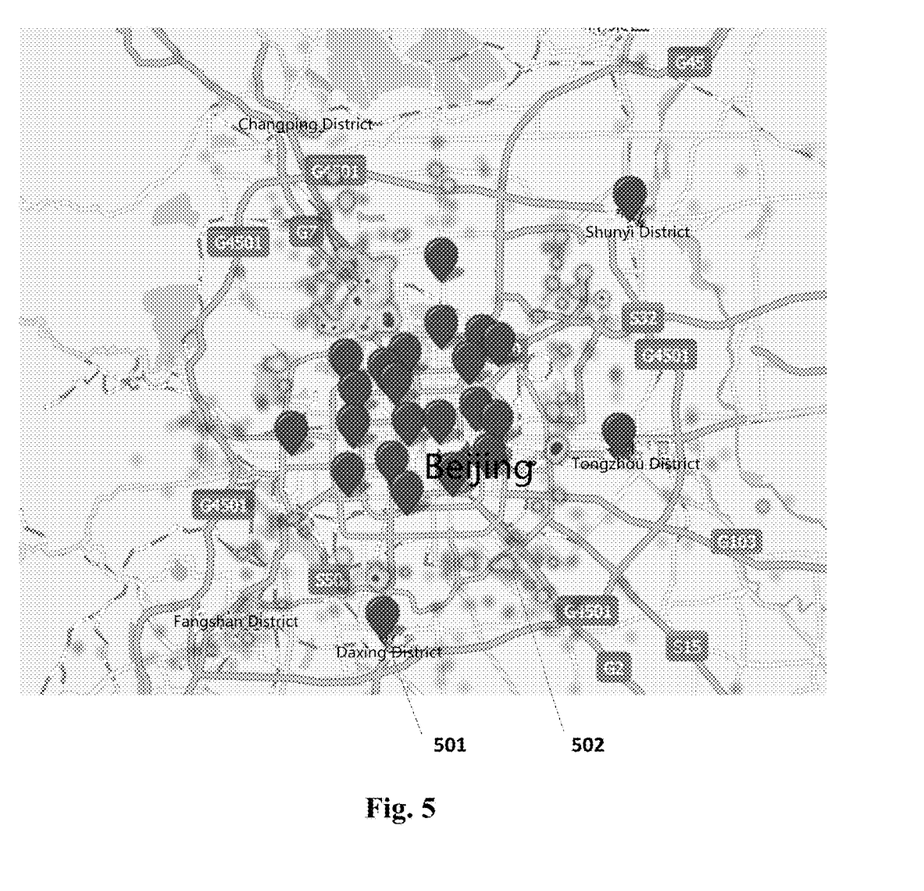
FIG. 5 shows a heat map illustrating existing points of interest and demand occurrence positions of unsatisfied demand information of the user after a position matching.

FIG. 5 shows a heat map obtained after a position matching illustrating existing points of interest and demand occurrence positions of unsatisfied demand information of the user.

As is shown in FIG. 5, the user demands within the supply region of the existing point of interest 501 have been satisfied, so that a heat map of distribution of demand occurrence position 502 of the user that have not been satisfied is provided.

In some optional implementations, a time matching may be further performed based on the above position matching. In particular, the demand occurrence time is matched with supply time. If the demand occurrence time of the user is beyond the supply time of existing points of interest, the user demand is not satisfied.

In some optional implementations, a quantity matching may be further performed based on the above position matching or based on both the position matching and time matching. The demand quantity is matched with supply quantity. If the demand quantity exceeds predetermined times of the supply quantity, the user demands in correspondence with the excess demand quantity are not satisfied.

Returning to FIG. 1, in step 140, the location of the new point of interest is determined based on the demand information of unsatisfied demand information of the user.

In this embodiment, for determining the location of the new point of interest based on the unsatisfied demand information of the user, the location of the new point of interest may be determined by maximizing the satisfaction degree for the unsatisfied demand information of the user.

For example, a suitable grid granularity may be set so that the quantity of the demand occurrence positions of unsatisfied demand information of the user within a grid is maximized, and thus the location of the new point of interest is determined based on the center point of the grid.

In some optional implementations, the determined location of the new point of interest may be determined as a start location which is optimized based on other parameters that can influence the determination of the location of the new point of interest (for example, the population flow) to determine the location of the new point of interest.

According to the method for determining the location of a new point of interest described in the above embodiment of the present application, the location of a new point of interest is determined by obtaining the unsatisfied demand information of the user, which provides more accurate demand information for determining the new point of interest, and improves the accuracy and reliability for determining the location of the new point of interest.

Further, in some optional implementations, the unsatisfied demand information of the user includes multidimensional parameters, by which the location of the new point of interest can be determined more accurately to fulfill multiple demand of users.

Further, in some optional implementations, the start location of a new point of interest may be determined first according to the quantity of demand information to be satisfied, and then further optimized according to other parameters that can influence the determination of the location of the new point of interest. Thus the location of the new point of interest is determined with a further improved accuracy.

Two methods for determining the location of a new point of interest based on demand information to be satisfied are described below respectively in conjunction with FIGS. 6 and 7.

Figure 6:
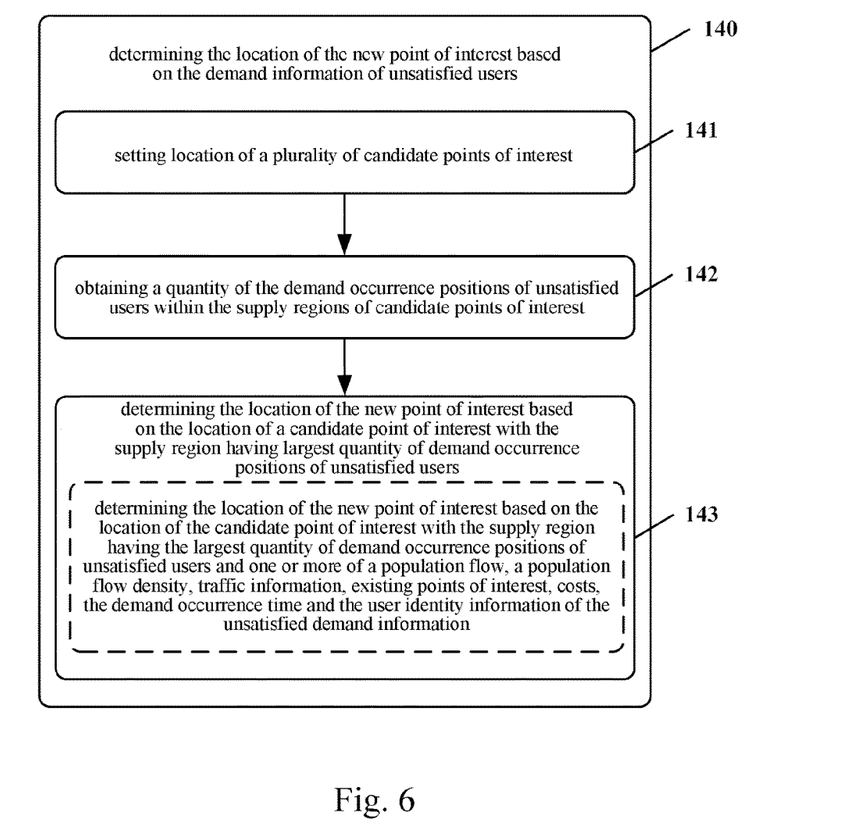
FIG. 6 shows a flow chart illustrating an schematic implementation of determining a location of a new point of interest based on unsatisfied demand information of the user according to an embodiment of the present application.

Further, referring to FIG. 6, a flow chart illustrating a schematic implementation for determining the location of a new point of interest based on unsatisfied demand information of the user, i.e. a flow chart illustrating a schematic implementation of step 140 in the above method, is shown according to the present disclosure.

As is shown in FIG. 6, the step 140 in the above method may include the following steps.

In step 141, locations of a plurality of candidate points of interest are set.

In this embodiment, locations of a plurality of candidate points of interest may be originated from an intended location input by an operator that determines the location of a new point of interest or a position selecting operation in a distribution heat map of the demand occurrence positions of unsatisfied demand information of the user received from an operator, and may be originated from the location obtained by data analysis on the demand occurrence positions of unsatisfied demand information of the user. The quantity of positions of the candidate points of interest may be originated from the quantity of the intended locations input by the operator or the quantity of position selecting operations in a distribution heat map of the demand occurrence positions of unsatisfied demand information of the user received from the operator and may be originated from the quantity of locations obtained by data analysis on the demand occurrence positions of unsatisfied demand information of the user.

Next, in step 142, the quantities of the demand occurrence positions of unsatisfied demand information of the user within supply regions of the candidate points of interest are obtained.

In this embodiment, for obtaining the quantity of demand occurrence positions of the unsatisfied demand information of the user within the supply regions of candidate points of interest, the supply region of a candidate point of interest may be determined first based on the supply regions of existing points of interest with the same or similar type, scale, user evaluations, and the like of the new point of interest, or based on the supply regions input by an operator.

After the supply regions of the candidate points of interest are determined, the demand occurrence positions of the unsatisfied demand information of the user within the supply regions are obtained, and thereby the quantities of demand occurrence positions of the unsatisfied demand information of the user within the supply regions of candidate points of interest are obtained.

Next, in step 143, the location of a new point of interest is determined based on the location of the candidate point of interest within the supply region having the largest quantity of demand occurrence positions of unsatisfied demand information of the user.

In this embodiment, the location of the candidate point of interest within the supply region having the largest quantity of demand occurrence positions of unsatisfied demand information of the user may be directly determined as the location of the new point of interest. Alternatively, the location of the candidate point of interest within the supply region having the largest quantity of demand occurrence positions of unsatisfied demand information of the user may be determined as the start location of the new point of interest, and then the start location is optimized based on parameters such as population flow and the like to obtain the location of the new point of interest.

In some optional implementations, the step 143 in the above method may also includes: determining the location of a new point of interest based on the location of the candidate point of interest within the supply region having the largest quantity of demand occurrence positions of unsatisfied demand information of the user and one or more of the following parameters: a population flow, a population flow density, traffic information, existing points of interest, costs, the demand occurrence time and the user identity information of the unsatisfied demand information of the user.

The weight value of the population flow may be higher than that of the other parameters.

When the user identity information parameter is introduced to determine the location of the new point of interest, a gender, an age, an occupation, an income and the like of a user may be determined based on the user identity information, and the location of the new point of interest is then determined based on the gender, age, occupation, income and the like of the user.

According to the implementation for determining the location of a new point of interest based on the unsatisfied demand information of the user described in the above embodiments of the present application, the location of a new point of interest is determined based on the location of the candidate point of interest within the supply region having the largest quantity of demand occurrence positions of unsatisfied demand information of the user and one or more parameters, which improves the accuracy and reliability for determining the location of the new point of interest.

Figure 7:
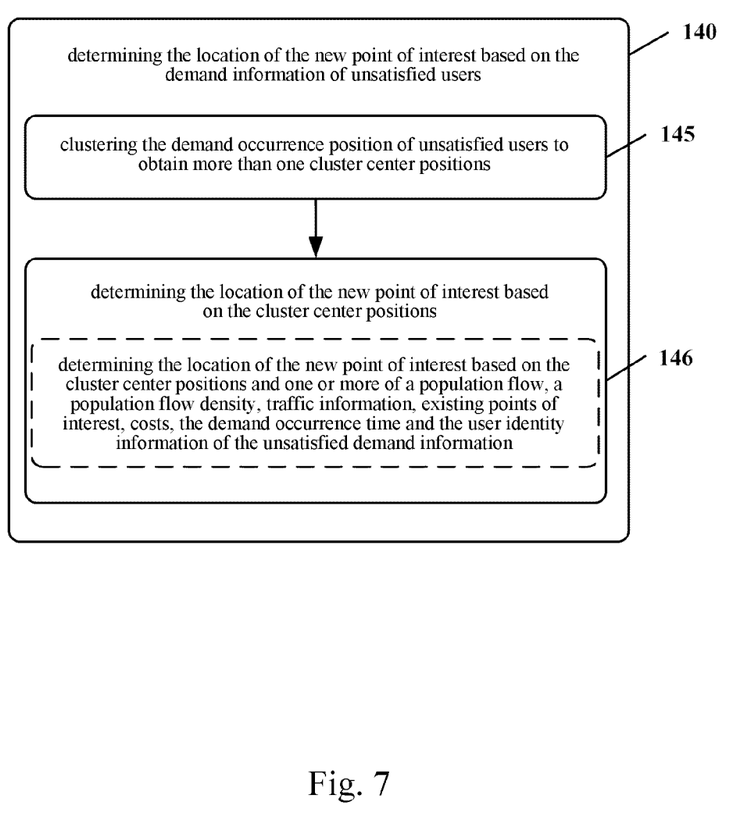
FIG. 7 shows a flow chart illustrating another schematic implementation of determining a location of a new point of interest based on unsatisfied demand information of the user according to an embodiment of the present application.

Further, referring to FIG. 7, a flow chart illustrating another schematic implementation for determining the location of a new point of interest based on the unsatisfied demand information of the user, i.e. a flow chart illustrating another schematic implementation of step 140 in the above method, is shown according to an embodiment of the present disclosure.

As is shown in FIG. 7, the step 140 in the above method may include the following steps.

In step 145, demand occurrence positions of unsatisfied demand information of the user are clustered to obtain more than one cluster center positions. For example, the demand occurrence positions of unsatisfied demand information of the user may be clustered by using the Density-Based Spatial Clustering of Applications with Noise (DBSCAN) to obtain more than one cluster center positions.

It should be understood that other existing and future-developed clustering algorithms may also be used, which is not limited in the present application.

Figure 8:
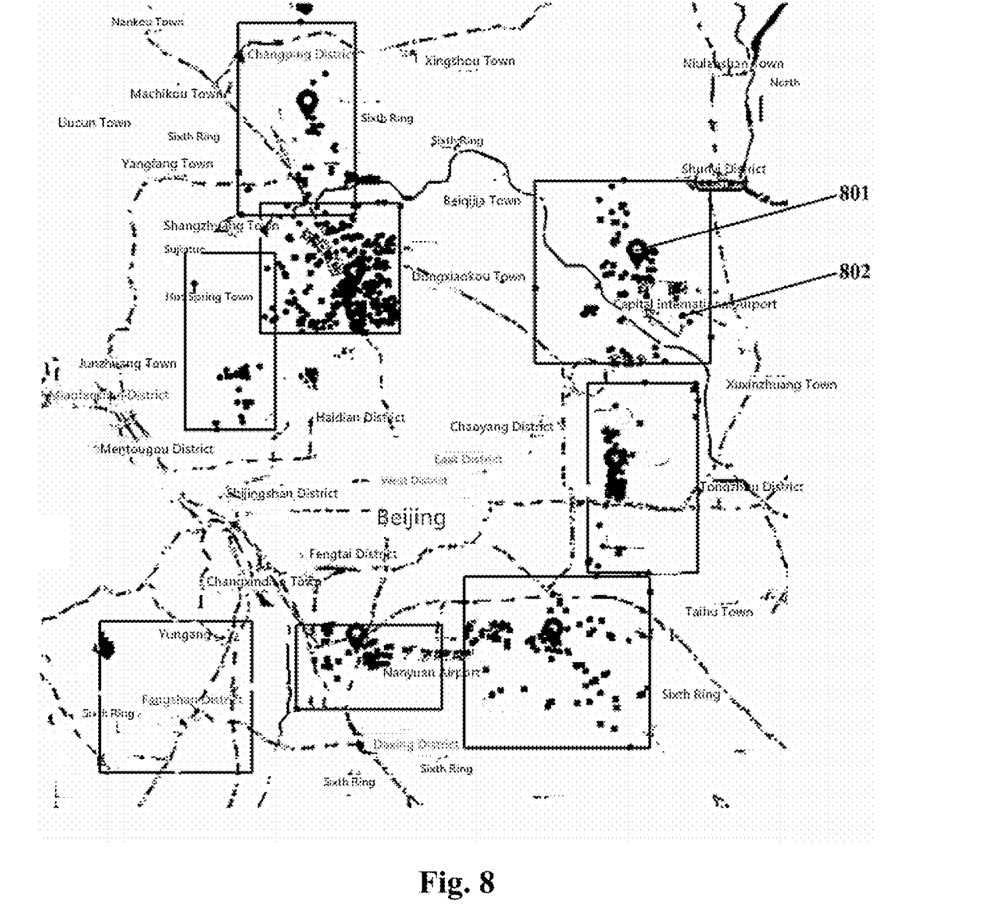
FIG. 8 shows a schematic diagram of a snapshot of a map illustrating a plurality of center positions obtained by clustering demand occurrence positions of unsatisfied demand information of the user.

FIG. 8 shows a schematic diagram of a snapshot of a map illustrating a plurality of center positions obtained by clustering the demand occurrence positions of unsatisfied demand information of the user.

As is shown in FIG. 8, a cluster center position 802 is obtained by clustering demand occurrence positions 801 of unsatisfied demand information of the user with a clustering algorithm.

Returning to FIG. 7, in step 146, the location of the new point of interest is determined based on the cluster center positions.

In this embodiment, the cluster center position may be directly determined as the location of the new point of interest. Also, the cluster center position may be determined as the start location of the new point of interest, and the start location is then further optimized based on parameters such as the population flow so as to obtain the location of the new point of interest.

In some optional implementations, the step 146 in the above method may also include: determining the location of the new point of interest based on the cluster center positions and one or more of the following parameters: a population flow, a population flow density, traffic information, existing points of interest, costs, the demand occurrence time and the user identity information of the unsatisfied demand information of the user.

The weight value of the population flow is higher than that of the other parameters.

When the user identity information parameter is introduced to determine the location of a new point of interest, a gender, an age, an occupation, an income and the like of a user may be determined based on the user identity information, and the location of the new point of interest is then determined based on the gender, age, occupation, income and the like of the user.

Figure 9:
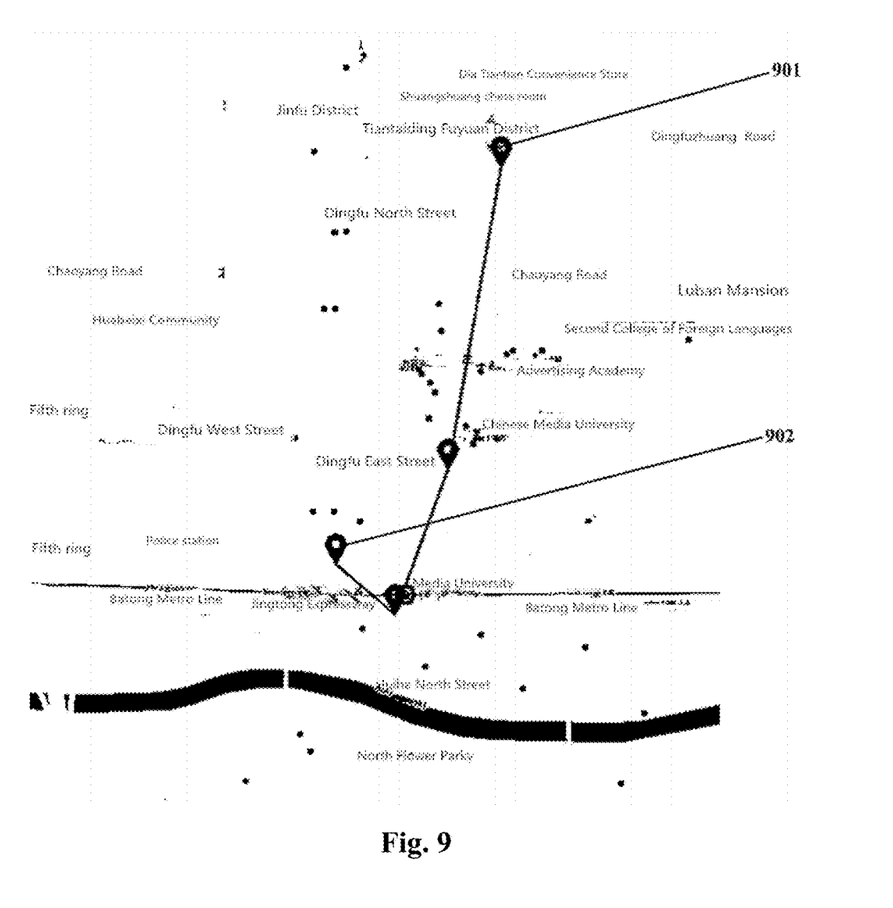
FIG. 9 shows a schematic diagram of a snapshot of a map illustrating one cluster center position of FIG. 8 and a location of a new point of interest obtained by optimizing the cluster center position.

FIG. 9 shows a schematic diagram of a snapshot of a map illustrating one cluster center position of FIG. 8 and a location of a new point of interest obtained by optimizing the cluster center position.

As is shown in FIG. 9, a cluster center position 901 is optimized by introducing other parameters that can influence the determination of the location of the new point of interest, so as to obtain the location of the new point of interest 902.

According to the implementation for determining the location of a new point of interest based on the unsatisfied demand information of the user described in the above embodiments of the present application, the location of the new point of interest is determined based on cluster center positions and one or more parameters, which improves the accuracy and reliability of determining the location of the new point of interest.

Figure 10:
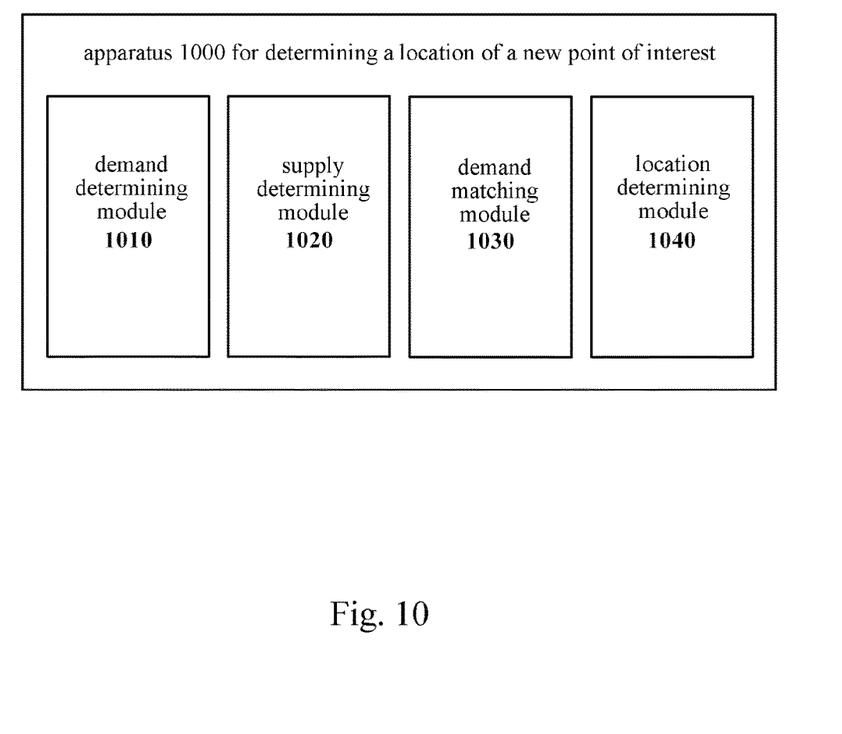
FIG. 10 shows an illustrative structural block diagram of an apparatus for determining a location of a new point of interest according to an embodiment of the present application.

Further, referring to FIG. 10, a schematic diagram of an apparatus for determining the location of a new point of interest is shown.

As shown in FIG. 10, an apparatus 1000 for determining the location of a new point of interest may include: a demand determining module 1010, a supply determining module 1020, a demand matching module 1030 and a location determining module 1040.

The demand determining module 1010 may be configured to determine demand information of a user based on retrieval data of the user, wherein the retrieval data includes at least data of point of interest, and the demand information includes at least a demand occurrence position.

The demand determination module 1010 may firstly obtain the retrieval data of a user based on the retrieval request received from the user. The retrieval data may include data of point of interest from a retrieval engine and the position where the retrieval is performed (for example latitude and longitude coordinates). Optionally, the retrieval data may also include but is not limited to at least one of the following data from a retrieval engine: user identity information, time and key words of a retrieval request, and the like. The retrieval data may also include data of the point of interest and a start point (name and coordinates) from a map service. Optionally, the retrieval data may also include but is not limited to at least one of the following data from the map service: user identity information, time of the retrieval request, a destination point (name and coordinates) and current position coordinates, and the like. The above data of point of interest may include but is not limited to at least one of a name, a type, latitude and longitude coordinates, a specific address, a business district of a point of interest and the like.

Next, the demand determining module 1010 may determine the user demand information based on the retrieval data of the user. The determined demand information may include the demand occurrence position. Optionally, the demand information determined by the determining module 1010 may also include but is not limited to at least one of demand occurrence time, demand quantity, and user identity information.

The supply determining module 1020 may be configured to obtain the supply information of an existing point of interest based on the retrieval data. The supply information may include at least a supply region.

The supply determining module 1020 uses the same retrieval data as the demand determining module 1010, which will not be detailed herein. The supply information of a point of interest used by the supply determining module 1020 may be originated from a retrieval engine or a database storing supply information of preset points of interest. The supply information may include a supply region. Optionally, the supply information of a point of interest used by the supply determining module 1020 may also include but is not limited to at least one of: a supply location, supply time, and supply quantity. The supply region may be determined based on the distance between the demand occurrence position and the supply location for the demand that has been satisfied. For example, the radiation radius of the supply region may be determined based on the distance between the demand occurrence position and the supply location of the demands of 80% of its users that have been satisfied.

The demand matching module 130 may be configured to match the user demand information with the supply information of existing points of interest to obtain unsatisfied demand information of the user.

For matching the demand information with the supply information of existing points of interest, the demand matching module 1030 may perform a position matching first, i.e., matching a demand occurrence position of a user within the supply region of the existing points of interest. If the demand occurrence position is located outside the supply region, the corresponding user demand is not satisfied.

Optionally, the demand matching module 1030 may further perform a time matching based on the above position matching, i.e., matching the demand occurrence time with the supply time. If the demand occurrence time of a user is beyond the supply time of existing points of interest, the user demand is not satisfied Optionally, the demand matching module 1030 may further perform a quantity matching based on the above position matching or based on both the position matching and time matching, i.e., matching demand quantity with supply quantity. If the demand quantity exceeds predetermined times of the supply quantity, the user demand in correspondence with the excess demand quantity are not satisfied.

The location determining module 1040 may be configured to determine the location of the new point of interest based on the unsatisfied demand information of the user.

For determining the location of a new point of interest based on the unsatisfied demand information of the user, the location determining module 1040 may determine the location of the new point of interest based on maximizing the satisfaction degree for the unsatisfied demand information of the user. For example, the quantity of the demand occurrence positions of unsatisfied demand information of the user within a grid is maximized by selecting a suitable grid granularity, so that the location of a new point of interest is determined based on the center point of the grid.

Alternatively, the location determining module 1040 may determine the location of the new point of interest as a start location, and then the start location is optimized based on other parameters that can influence the determination of the location of the new point of interest (for example, population flow), and thus the position of the new point of interest is determined.

In some optional implements (not shown), the location determining module 1040 may include: a candidate location setting module, a coverage quantity obtaining module and a first location determining submodule. The candidate location setting module may be configured to set the locations of a plurality of candidate points of interest; the coverage quantity obtaining module may be configured to obtain the quantity of the demand occurrence positions of the unsatisfied demand information of the user within the supply regions of the candidate points of interest; the first location determining submodule may be configured to determine the location of a new point of interest based on the location of the candidate point of interest within the supply region having the largest quantity of demand occurrence positions of unsatisfied demand information of the user.

Further, in the above implementations, the first location determining submodule may determine the location of a new point of interest based on the location of the candidate point of interest within the supply region having the largest quantity of demand occurrence positions of unsatisfied demand information of the user and one or more of the following parameters: a population flow, a population flow density, traffic information, existing points of interest, costs, the demand occurrence time and the user identity information of the unsatisfied demand information of the user.

In some other optional implementations (not shown), the location determining module 1040 may include a clustering module and a second location determining submodule. The clustering module may be configured to cluster the demand occurrence positions of unsatisfied demand information of the user to obtain more than one cluster center positions; the second location determining submodule may be configured to determine the location of the new point of interest based on the cluster center positions.

Further, in the above implementations, the second location determining submodule may determine the location of the new point of interest based on cluster center positions and one or more of the following parameters: a population flow, a population flow density, traffic information, existing points of interest, costs, the demand occurrence time and the user identity information of the unsatisfied demand information of the user. Optionally, the weight value of the population flow may be higher than that of the other parameters.

According to the apparatus for determining the location of a new point of interest described in the above embodiments of the present application, the demand matching module 1030 is configured to obtain the unsatisfied demand information of the user, and the location determining module 1040 is configured to determine the location of a new point of interest, which provides a more accurate demand information for determining a new point of interest, and improves the accuracy and reliability with which the location of the new point of interest is determined.

Further, in some optional implementations, the unsatisfied demand information of the user obtained by the demand matching module 1030 includes multidimensional parameters, by which the location of the new point of interest can be determined more accurately to fulfill multiple demand of users.

Further, in some optional implementations, the location determining module 1040 may first determine the start location of a new point of interest according to the demand quantity of the demand information to be satisfied, and the start location is then further optimized according to other parameters that can influence the determination of the location of the new point of interest, and thus the location of a new point of interest is determined with improved accuracy.

It should be appreciate that the various units described in the apparatus 1000 correspond to the various steps in the methods depicted with reference to FIGS. 1, 6 and 7. Therefore, the operations and features described above for the method for determining the location of a new point of interest are also applicable to the apparatus 1000 and the units within the apparatus 1000, which will not be repeated herein. Corresponding units in the apparatus 1000 may cooperate with units in a server or a server group to achieve the solution of the embodiment of the present application.

The flow charts and block diagrams in the figures illustrate architectures, functions, and operations that may be implemented according to the system, the method and the computer program product of various embodiments of the present invention. In this connection, each of the blocks in the flow charts and block diagrams may represent a module, a program segment or a portion of code including one or more executable instructions for implementing the specific logical function. It should be noted that, in some optional implementations, the function described in the blocks may occur in a different sequence from that as shown in the figures. For example, in practice, two sequential blocks may be executed substantially in parallel, and or sometimes in a reverse order, depending on the functionality involved. It should also be noted that, each block in the block diagrams and/or the flow charts and a combination of the blocks in the block diagrams and/or the flow charts may be implemented by a specific hardware-based system which executes specific functions or operations, or by a combination of a specific hardware and computer instructions.

The modules involved in the embodiments of the present application may be implemented by way of hardware or software. The described module may also be provided in a processor, which, for example, is described as: a processor, comprising a demand determining module, a supply determining module, a demand matching module and a location determining module. In some cases, the names of the modules are not considered as a limitation to the modules. For example, the demand determining module may also be described as "a module for determining demand information of a user based on retrieval data of the user".

For another aspect, an embodiment of the present application also provides a computer readable storage medium. The computer readable medium may be the computer readable storage medium included in the apparatus of the above embodiments, and it also may be a separate computer readable storage medium which has not been assembled to an apparatus. The computer readable storage medium stores one or more programs, which are used by one or more processors to execute the method for determining a location of a new point of interest described in an embodiment of the present application.

The preferred embodiments of the present application and the applied technical principles are described above. It should be understood by those skilled in the art that the scope of the present application is not limited to technical solutions formed by specific combinations of the above technical features, but should also cover other technical solutions formed by any combinations of the above described technical features or equivalents thereof without departing from the concept of the invention. For example, a technical solution formed by replacing the feature disclosed above with similar functions is also within the scope of the present invention.

What is claimed is:

1. A method for determining a location of a to-be-established point of interest, the method comprising:

determining demand information of a user based on retrieval data of the user, wherein the retrieval data includes at least data of point of interest and the demand information includes at least a demand occurrence position of the user;

obtaining supply information of existing points of interest based on the retrieval data, wherein the supply information includes at least a supply region, the supply region being determined based on a distance between the demand occurrence position of the user and a supply location for a demand that has been satisfied in a historical data obtained from a plurality of users;

matching the demand information of the user with the supply information of the existing points of interest to obtain unsatisfied demand information of the user, wherein the unsatisfied demand information is information on demands unsatisfied by the existing points, the unsatisfied demand information including parameters by which locations of new points of interest that fulfill multiple demands of the user can be determined; and determining a location of a new point of interest based on the unsatisfied demand information of the user by:

clustering the demand occurrence position of the unsatisfied demand information of the user to obtain more than one cluster center positions; and determining the location of the new point of interest based on the cluster center positions, wherein the clustered center positions are determined as the location of the new point of interest.

2. The method according to claim 1, wherein the demand information further includes one or more of demand occurrence time, a demand quantity, and user identity information.

3. The method according to claim 1, wherein the supply information further includes one or more of a supply location, supply time, and a supply quantity.

4. The method according to claim 1, further comprising optimizing the location of the new point of interest based on one or more of a population flow, a population flow density, traffic information, existing points of interest, costs, the demand occurrence time and the user identity information of the unsatisfied demand information of the user.

5. The method according to claim 4, wherein a weight value of the population flow is higher than that of the other parameters.

6. The method according to claim 1, wherein the supply region included in the supply information of existing points of interest is determined based on a distance between the demand occurrence position of the user and a supply location for a demand that has been satisfied in the historical data for at least 80% of the users.

7. The method according to claim 1, wherein in response to the new point of interest being a leisure point of interest, a cluster center position where an unsatisfied demand is distributed more evenly per day is selected as the location of the new point interest.

8. The method according to claim 1, wherein in response to a demand of the new point of interest being concentrated on weekends and at dinner time, a cluster center position where a peak of an unsatisfied demand occurs on weekends and at dinner time is selected as the location of the new point interest.

9. The method according to claim 1, wherein the location of the new point of interest is determined based on a gender, an age, an occupation and income of the user.

10. The method according to claim 1, wherein the demand occurrence positions of unsatisfied demand information of the user are clustered by using density-based spatial clustering of applications with noise to obtain the more than one cluster center positions.

11. An apparatus for determining a location of a to-be-established point of interest, comprising:
a processor; and
a memory storing computer-readable instructions;
wherein, when the computer-readable instructions are executed by the processor, the processor is configured to:
determine demand information of a user base on retrieval data of the user, wherein the retrieval data includes at least data of point of interest and the demand information includes at least a demand occurrence position of the user;
obtain supply information of existing points of interest based on the retrieval data, wherein the supply information includes at least a supply region, the supply region being determined based on a distance between the demand occurrence position of the user and a supply location for a demand that has been satisfied in a historical data obtained from a plurality of users;
match the demand information of user with the supply information of the existing points of interest to obtain unsatisfied demand information of the user, wherein the unsatisfied demand information refers to information on demands would not be satisfied by the existing points, the unsatisfied demand information including parameters by which locations of new points of interest that fulfill multiple demands of the user can be determined; and
determine a location of a new point of interest based on the unsatisfied demand information of the user by:
clustering the demand occurrence position of the unsatisfied demand information of the user to obtain more than one cluster center positions; and
determining the location of the new point of interest based on the cluster center positions, wherein the clustered center positions are determined as the location of the new point of interest.

12. The apparatus according to claim 11, wherein the demand information further includes one or more of demand occurrence time, a demand quantity, and user identity information.

13. The apparatus according to claim 11, wherein the supply information further includes one or more of a supply location, supply time, and a supply quantity.

14. The apparatus according to claim 11, wherein the processor is further configured to optimize the location of the new point of interest based on one or more of a population flow, a population flow density, traffic information, existing points of interest, costs, the demand occurrence time and the user identity information of the unsatisfied demand information of the user.

15. The apparatus according to claim 14, wherein a weight value of the population flow is higher than that of the other parameters.

16. The apparatus according to claim 11, wherein the supply region included in the supply information of existing points of interest is determined based on a distance between the demand occurrence position of the user and a supply location for a demand that has been satisfied in the historical data for at least 80% of the users.

17. A non-transitory computer storing medium storing computer-readable instructions, wherein, when the computer-readable instructions are executed by a processor, the processor is configured to:
determine demand information of a user based on retrieval data of the user, wherein the retrieval data includes at least data of point of interest and the demand information includes at least a demand occurrence position of the user;
obtain supply information of existing points of interest based on the retrieval data, wherein the supply information includes at least a supply region, the supply region being determined based on a distance between the demand occurrence position of the user and a supply location for a demand that has been satisfied in a historical data obtained from a plurality of users;
match the demand information of the user with the supply information of the existing points of interest to obtain unsatisfied demand information of the user, wherein the unsatisfied demand information refers to information on demands would not be satisfied by the existing points, the unsatisfied demand information including parameters by which locations of new points of interest that fulfill multiple demands of the user can be determined; and determine a location of a new point of interest based on the unsatisfied demand information of the user by:
  clustering the demand occurrence position of the unsatisfied demand information of the user to obtain more than one cluster center positions; and
  determining the location of the new point of interest based on the cluster center positions, wherein the clustered center positions are determined as the location of the new point of interest.

18. The medium according to claim 17, wherein the supply region included in the supply information of existing points of interest is determined based on a distance between the demand occurrence position of the user and a supply location for a demand that has been satisfied in the historical data for at least 80% of the users.

* * * * *